United States Patent [19]

Koziol

[11] Patent Number: 4,478,205
[45] Date of Patent: Oct. 23, 1984

[54] DUAL ADJUSTABLE GAS INTAKE ASSEMBLY

[75] Inventor: Walter Koziol, Antioch, Ill.

[73] Assignee: Modern Home Products Corp., Antioch, Ill.

[21] Appl. No.: 548,723

[22] Filed: Nov. 4, 1983

[51] Int. Cl.³ .............................................. F24B 3/00
[52] U.S. Cl. ................................. 126/25 R; 126/41 R
[58] Field of Search ................. 126/25 R, 25 A, 25 B, 126/30, 9 R, 9 B, 39 R, 39 E, 41 R; 431/278, 279

[56] References Cited

U.S. PATENT DOCUMENTS

| | | | |
|---|---|---|---|
| 1,827,505 | 10/1931 | Bluhm | 431/278 |
| 2,094,854 | 10/1937 | Smith | 431/278 |
| 2,257,010 | 9/1941 | Hildebrand | 431/278 |
| 3,090,372 | 5/1963 | Evans | 126/41 |
| 3,322,112 | 5/1967 | Huff et al. | 126/41 R |
| 3,332,339 | 7/1967 | Helgeson et al. | 126/41 |
| 3,638,635 | 2/1972 | Drennan | 126/41 R |
| 3,878,829 | 4/1975 | Schantz | 126/41 R |
| 3,938,494 | 2/1976 | Clark | 126/41 R |
| 4,092,975 | 6/1978 | Grammatopoulos | 126/41 R |
| 4,149,516 | 4/1979 | Hall | 126/41 R |
| 4,267,816 | 5/1981 | Koziol | 126/41 R |
| 4,356,810 | 11/1982 | Ferlin | 126/41 R |
| 4,373,505 | 2/1983 | Koziol | 126/39 E |

*Primary Examiner*—Daniel J. O'Connor
*Attorney, Agent, or Firm*—Quarles & Brady

[57] ABSTRACT

A dual adjustable gas intake assembly for a barbecue grill which can be utilized with various types of gas barbecue grill burners. The venturi tube and an intermediate supply tube telescope together as does the intermediate supply tube and the gas intake member of the burner. Adjustable securing mechanisms are provided between the intermediate supply tube, the intake member and the venturi tube. The adjustable securing mechanisms are preferably compression nuts positioned on the intake member and the venturi tube for engagement with threads on the intermediate supply tube. The dual adjustable intake assembly affords both horizontal and vertical adjustment between the gas supply and the burner.

19 Claims, 7 Drawing Figures

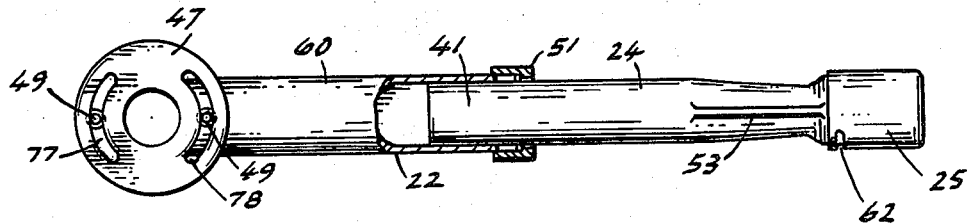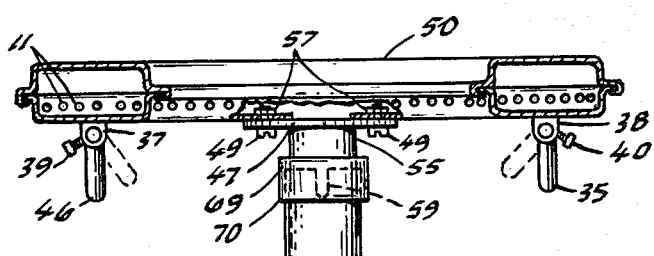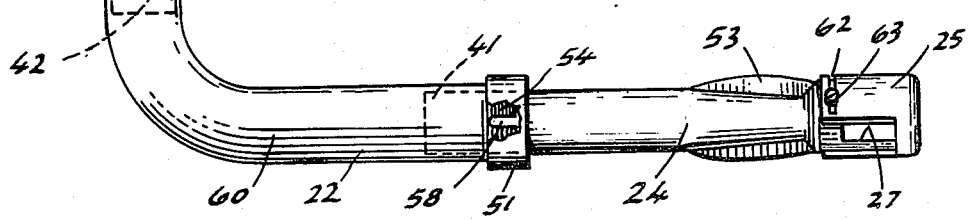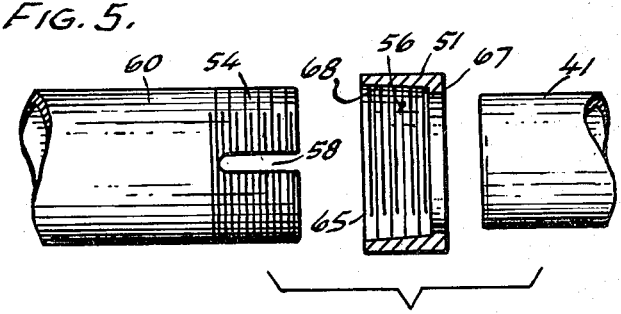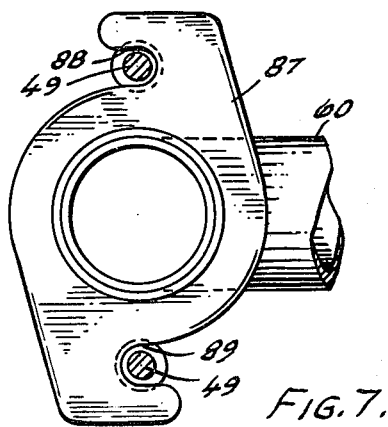

DUAL ADJUSTABLE GAS INTAKE ASSEMBLY

BACKGROUND OF THE INVENTION

This invention relates to a gas venturi tube for a burner element in a barbecue gas grill. More particularly, it relates to a two-way adjustable gas intake assembly for a gas burner element so that proper connection can be made between the burner element and a gas supply nozzle irrespective of the vertical and horizontal distance the burner element is supported from the floor in relation to the gas supply.

Various barbecue grill bases have floors for the burner element located at various positions on the floor and located both vertically and horizontally from the gas supply nozzle. Accordingly, it is necessary to construct each gas intake pipe and venturi tube to match the particular distance from the burner element and the gas supply nozzle so that the burner element is in communication with the gas supply pipe. Cost savings could be effected if one venturi tube is fabricated so as to fit in a suitable manner any burner element in a barbecue base portion and provide proper connection with a gas supply.

The state of the art for gas delivery systems for barbecue grills is illustrated in U.S. Pat. Nos. 3,638,635 and 4,373,505. In U.S. Pat. No. 3,638,635 a one-piece, non-adjustable venturi tube 64 extends from gas valve 70 to burner 25 and is attached thereto by base 65 and screws 63. In U.S. Pat. No. 4,373,505 which is commonly assigned, adjustable securing means such as represented by screw 51 and dimples 50 are provided on the venturi tube 24 and a gas intake tube 55.

It is an advantage of the present invention to provide a venturi tube for a burner in a gas barbecue grill which can operatively provide connection between numerous gas burner elements in grill base floors and a gas intake nozzle which is spaced both horizontally and vertically from the burner. It is another advantage of this invention to provide a dual adjustment means between a gas venturi tube and a burner element which can afford positioning of the burner element at various elevations from the floor as well as being spaced horizontally from the gas supply pipe. It is still another advantage of this invention to provide a secure dual adjustable gas intake assembly between a burner element and a gas supply pipe in a gas barbecue grill which will provide quick adjustment without leakage. It is yet another advantage of the present invention to provede a dual adjustable gas intake assembly for a gas grill burner element which can be manufactured and assembled in an economical manner. It is still another advantage of this invention to provide horizontal and vertical adjustment between the venturi tube and a gas intake pipe as well as adjustment for air in the air regulating member.

SUMMARY OF THE INVENTION

The foregoing advantages are accomplished by the present dual adjustable gas intake tube assembly for a gas burner element wherein the burner element has the usual hollow, apertured body member having a central portion for receiving a gas intake member. The dual adjustment of the gas intake tube assembly is effected by means of a first tubular or venturi member having at least one lateral aperture. An air regulator member is slidably received by the venturi member at one end thereof to controllably cover the lateral aperture. An opening is provided by the tubular member at one end for receiving a gas supply means. A second tubular member is in telescoping relationship with the first tubular member at the opposite end. A third tubular member is in telescoping relationship with the second tubular member at an end opposite the first tubular member. Connecting means are provided in conjunction with the third tubular member at the end opposite the second tubular member for connection with a gas burner element. Preferably, first and second adjustable securing means are operatively associated with the first and second tubular members and the second and third tubular members to adjustably secure the respective tubular members in a fixed position. In a preferred manner, at least one of the first and second securing means is provided by a tapered threaded compression nut with complementary thread means disposed on the second tubular member. In one embodiment the second tubular member is formed by a right-angled portion, and a slotted and rotatable connecting member operatively extends from the third tubular member at the end opposite the second tubular member for connection with the burner element.

BRIEF DESCRIPTION OF DRAWING

A better understanding of the present dual adjustable gas intake assembly for a burner element will be accomplished by reference to the drawing wherein:

FIG. 3 is a top plan view of the dual adjustable gas intake assembly with portions broken away and disconnected from the burner element.

FIG. 4 is a view in side elevation of the dual adjustable venturi tube connected to a burner element with portions of the burner element broken away and illustrating the adjustable leg members extending from the burner element.

FIG. 5 is a partial view of two of the tubular members forming the dual adjustable gas intake assembly and illustrating the connection thereof with a compression nut which is shown in vertical section.

FIG. 6 is a view similar to FIG. 5 illustrating the assembled and adjusted tubular members.

FIG. 7 is a view similar to FIG. 3 except showing a different embodiment of a mounting bracket for the dual adjustable gas intake assembly.

DESCRIPTION OF THE PREFERRED EMBODIMENT

Figure 1:
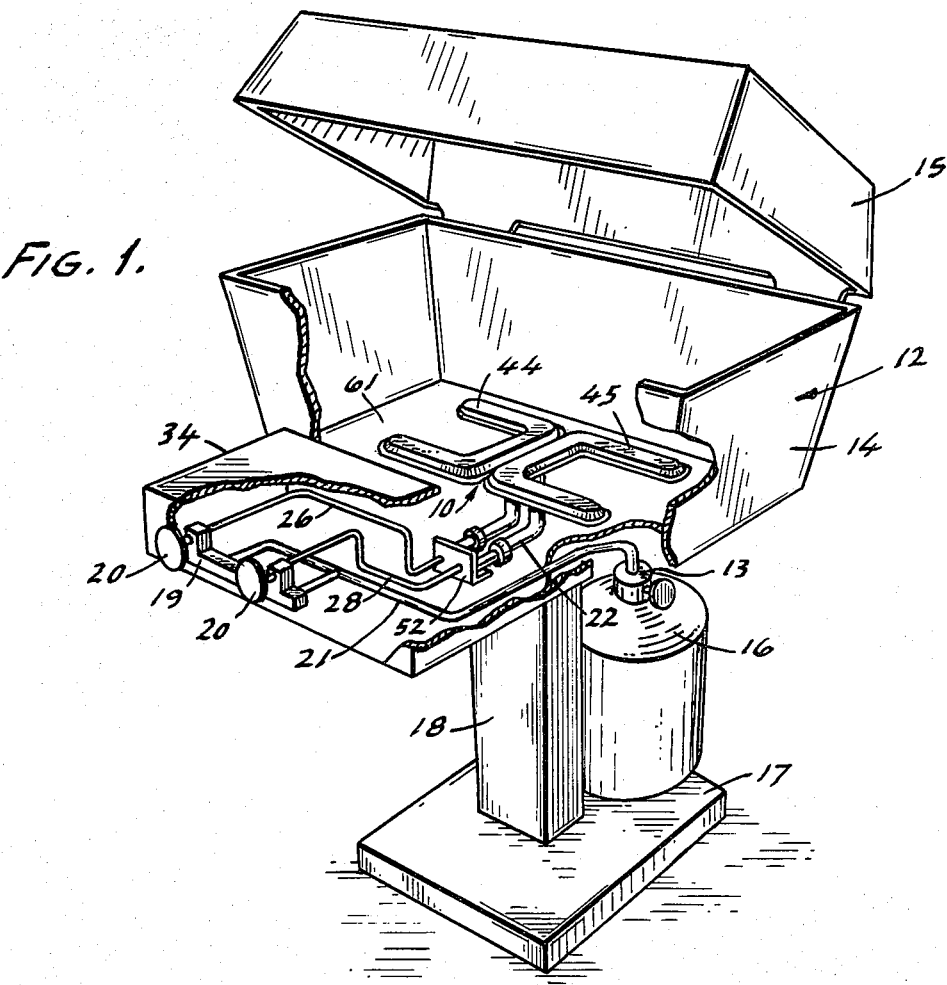
FIG. 1 is a perspective view of a gas barbecue grill unit with portions broken away to illustrate the dual adjustable gas intake or venturi tube assembly and burner element of this invention.

Proceeding to a detailed description of the present invention, a gas burner element generally 10 is shown in FIG. 1 and is utilized in conjunction with a gas barbecue grill unit 12. Grill unit 12 has a base member 14 and will include the usual grate (not shown) over the burner element and will include a cover 15. Base 14 is supported and secured to post 18 which in turn is secured to foot base 17. A gas supply tank 16 is seated on base 17 and has a valve 13 fitted thereon. A gas supply line 21 extends from valve 13 and is interconnected to gas control 19 equipped with control knobs 20. Gas feed lines 26 and 28 extend from gas control 19 in housing 34 as well as through support bracket 52 where each will be positioned in fluid communication with dual adjustable venturi or gas intake assembly 22. Each venturi tube assembly in turn is connected with the U-shaped hollow body members 44 and 45 of gas burner element 10.

Figure 2:
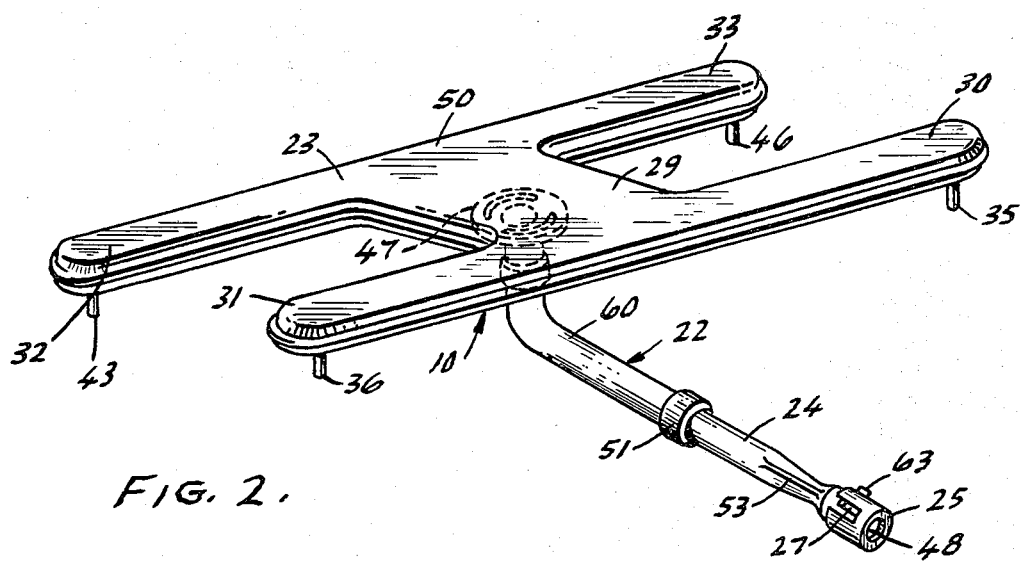
FIG. 2 is a perspective view of the dual adjustable venturi tube of this invention operatively connected to an alternative burner element.

Referring to FIG. 2, it will be seen that venturi tube assembly 22 includes a venturi tube 24 with the usual rotatable air regulator 25 to adjustably cover opening 27 with screw 63 providing movable capture by riding in a slot 62 (see FIG. 4) in regulator 25. Venturi tube 24 is secured to supply tube 60 by means of compression nut 51. Supply tube 60 is in turn connected to burner element 50 as will be later explained in conjunction with FIGS. 3 and 4. It will be seen that burner element generally 50 differs from burner 10 in that while having a hollow body member 23, it has a common central portion 29 from which extend arm portions 30, 31, 32 and 33. Projecting from each arm portion 30-33 are adjustable leg members 35, 36, 43 and 46, respectively.

Referring to FIGS. 3 and 4, it will be seen that circular flange 47 has two arcuate slots 77 and 78 which will receive screws 49 which in turn are fastened to nuts 57 carried by burner element 50. Flange 47 is connected to gas intake member 55 which will extend into supply tube 60. A compression nut 70 will adjustably hold gas intake member 55 in supply tube 60 in a fluid tight connection. A slot 59 in supply tube 60 will aid in the compressive connection. Compression nut 70 also has an end wall 69 which will hold a gasket member (not shown) against the end of supply tube 60 as well as against end wall 69 of compression nut 70. This will be further indicated in conjunction with the connection between venturi tube 24 and supply tube 60 as indicated in FIGS. 5 and 6. Gas intake member 55 will have an extension portion 42 which will extend well into supply tube 60 to afford the requisite vertical adjustment between tube 60 and burner element 50. It will also be noted in conjunction with burner element 50 that leg members such as 46 and 35 are pivotally and longitudinally adjustable by being carried in tubular portions 37 and 38 which form a part of burner element 50 and secured by screws 39 and 40. For further detail regarding the adjustable legs, reference is made to U.S. Pat. No. 4,267,816 of the same inventor. Venturi tube 24 has the usual finned section such as indicated at 53 for strength purposes. Also as illustrated in FIG. 4, slot 62 in rotatable air regulator 25 affords rotatable adjustment under screw head 63 to adjust opening 27.

Referring to FIGS. 5 and 6, the attachment between supply tube 60 and venturi tube 24 is specifically illustrated. It will be seen that venturi tube 60 has oppositely opposed slots, one of which is indicated at 58, as well as adjacent and circumferentially positioned threads 54. Extension 41 of venturi tube 24 is shown inserted through compression nut 51 and into supply tube 60. With extension 41 positioned at a desired horizontal position or location, compression nut 51 with gasket 66 placed inside end annular wall 67 will threadably engage threads 54 by means of internal threads 65. A tapering surface 68 inside compression nut 51 as well as slots such as 58 in gas supply tube 60 will provide the necessary compressive force between the inside wall of tube 60 and the outside wall of extension 41 with gasket 66 sealing the end of tube 60 over venturi tube 24. It will be recognized that compression nut 70 will secure gas intake member 55 and venturi tube 60 in the same manner as previously described for compression nut 51.

An important aspect of this invention is the fact that both longitudinal or horizontal adjustment as well as vertical adjustment is afforded between a gas burner such as 50 and gas supply tubes such as 26 and 28 which will have the usual nozzle portions at the end thereof. When it is desired to assemble the dual adjustable venturi assembly with burner element 50, all that is required is for flange 47 to be secured to burner 50 by means of screws 49 being passed through slots 77 and 78 so that screws will engage nuts 57. Gas intake member 55 will then be inserted into intermediate tube 60 to the desired distance so that leg members 35, 36, 43 and 46 will rest on footpads or similar surfaces on floor 61 of base member 14 of gas grill unit 12. The next alignment which will be made will be to place the nozzles of gas feed lines 26 and 28 in opening 48 of rotatable air regulator 25. Suitable adjustment again will be made between venturi tube 24 and supply tube 60 with insertion of portion 41 of venturi tube 24 into supply tube 60 and connection made by means of compression nut 51. It should also be pointed out that in addition to the dual adjustment of both longitudinal or horizontal distance as well as vertical adjustment, radial adjustment for screws 49 and nuts 57 is also afforded with the burner 50 by means of flange 47 with arcuate slots 77 and 78.

Gas-fired grill unit 12 is made of cast aluminum whereas the burner element 50 is manufactured from steel. Venturi tube 24 as well as supply tube 60 and gas intake member 55 are also made from steel and are usually cross-plated. Screws 49 and 63 are of the machine type. Compression nuts 51 and 70 are standard components and are available from any supplier of nuts and bolts. While burners 44 and 45 are shown as U-shaped, it will be appreciated that the adjustable tube assembly of this invention could be utilized with any configuration of burner, as indicated by burner 50, whether of a straight tube, star-shaped or figure eight variety.

It will thus be seen that in the present invention there is now provided a dual adjustable venturi assembly which is fabricated to fit numerous types of barbecue grills irrespective of the vertical and horizontal space differences between the burner element and the gas supply means. Not only is horizontal and vertical adjustment afforded but also radial adjustment as well. The various adjustments of the venturi tube and gas supply tubes are easily effected by means of compression nuts and in conjunction with adjustable leg members afford very versatile adjustable venturi tube assemblies particularly useful in conjunction with the gas supply that is positioned at right angles with respect to the burner element. While compression nuts such as 51 and 70 have been indicated for securing supply tube 60 to venturi tube 24 and gas intake member 55, other types of fluid tight securing means could be utilized such as a standard silicone ≠o" ring. Also, while the gas supply tubes and nozzles have been indicated for connection through an air regulator 25, obviously various types of connections can be made with the gas supply tube and the venturi tube 24 and still utilize the dual adjustable features of this invention. Further, a rounded bracket or flange 47 is indicated in FIG. 3 with closed arcuate slots 77 and 78. If desired, mounting bracket or flange 87 could be used in conjunction with supply tube 60 and gas intake member 55, with flange 87 having open slots 88 and 89 and the bracket being generally Z-shaped. Aslo, if desired, screw 49 could be positioned in burner element 50 and nut 57 positioned under slots 88 and 89.

Compression nut 51 has been illustrated for adjustably securing venturi tube 24 to supply tube 60. If desired, although not as efficient, compression nut 51 could be eliminated with extension 41 positioned loosely in supply tube 60 while retaining compression nut 70 for adjustably securing supply tube 60 to gas intake member 55.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A dual adjustable gas intake tube assembly for a gas burner element comprising:
   a first tubular member defining at least one lateral aperture;
   an air regulator member slidably received by said tubular member at one end thereof to controllably cover said lateral aperture;
   an opening defined by said tubular member at one end for receiving a gas supply means;
   a second tubular member in telescoping relationship with said first tubular member at the other end;
   a third tubular member in telescoping relationship with said second tubular member at an end opposite said first tubular member;
   means operatively associated with said third tubular member at an end opposite said second tubular member for connection with a gas burner element; and
   first and second adjustable securing means operatively associated with said first and second tubular members and said second and third tubular members to adjustably secure said respective tubular members in a fixed position.

2. The dual adjustable gas intake tube assembly as defined in claim 1 wherein at least one of said first and second securing means is defined by a tapered threaded compression nut and complementary thread means provided on said second tubular member.

3. The dual adjustable gas intake tube assembly as defined in claim 1 wherein said second tubular member is defined by a right-angled portion.

4. The dual adjustable gas intake tube assembly as defined in claim 1 wherein said second tubular member is defined by a right-angled portion and further includes a slotted and rotatable connecting member operatively extending from said third tubular member at the end opposite said second tubular member for connection with said burner element.

5. The dual adjustable gas intake tube assembly as defined in claim 1 wherein said air regulator includes an opening for receiving said gas supply means.

6. The dual adjustable gas intake tube assembly as defined in claim 1 wherein said first or second securing means is operatively associated with said first and second tubular members and is defined by a tapered threaded compression nut, complementary thread means provided on said second tubular member, and at least one slot in said second tubular member extending inwardly from the end of said second tubular member.

7. The dual adjustable gas intake assembly as defined in claim 1 wherein said first or second securing means is operatively associated with said first and second tubular members and is defined by a tapered threaded compression nut, complementary thread means provided on said second tubular member, and at least one slot in said second tubular member extending inwardly from the end of said second tubular member with said compression nut including an annular portion extending inwardly toward said first tubular member and further comprising a gasket member positioned between said annular portion and the end of said second tubular member.

8. A dual adjustable gas burner assembly comprising:
   a first tubular member defining at least one lateral aperture;
   an air regulator member slidably received by said tubular member at one end thereof to controllably cover said lateral aperture;
   an opening defined by said tubular member at one end for receiving a gas supply means;
   a second tubular member in telescoping relationship with said first tubular member at the other end;
   a third tubular member in telescoping relationship with said second tubular member at an end opposite said first tubular member;
   means operatively associated with said third tubular member at an end opposite said second tubular member for connection with a gas burner element;
   first and second securing means operatively associated with said first and second tubular members and said second and third tubular members to adjustably secure said respective tubular members in a fixed position; and
   a burner element adapted to be connected to said third tubular member at an end opposite said second tubular member, said burner element including adjustable leg means.

9. The dual adjustable gas burner assembly as defined in claim 8 wherein at least one of said first and second securing means is defined by a tapered threaded compression nut and complementary thread means provided on said second tubular member.

10. The dual adjustable gas burner assembly as defined in claim 8 wherein said second tubular member is defined by a right-angled portion.

11. The dual adjustable gas burner assembly as defined in claim 8 wherein said second tubular member is defined by a right-angled portion and further includes a slotted and rotatable connecting member operatively extending from said third tubular member at the end opposite said second tubular member for connection with said burner element.

12. The dual adjustable gas burner assembly as defined in claim 8 wherein said air regulator includes an opening for receiving said gas supply means.

13. The dual adjustable gas burner assembly as defined in claim 8 wherein said first or second securing means is operatively associated with said first and second tubular members and is defined by a tapered threaded compression nut, complementary thread means provided on said second tubular member, and at least one slot in said second tubular member extending inwardly from the end of said second tubular member.

14. The dual adjustable gas burner assembly as defined in claim 8 wherein said first or second securing means is operatively associated with said first and second tubular members and is defined by a tapered threaded compression nut, complementary thread means provided on said second tubular member, and at least one slot in said second tubular member extending inwardly from the end of said second tubular member with said compression nut including an annular portion extending inwardly toward said first tubular member and further comprising a gasket member positioned between said annular portion and the end of said second tubular member.

15. The dual adjustable gas burner assembly as defined in claim 8 further including a base member for a barbecue grill with said burner element and said tubular members housed therein.

16. The dual adjustable gas burner assembly as defined in claim 8 further including a base member for a barbecue grill with two of said burner elements housed therein as well as two of said first, second and third tubular members.

17. The dual adjustable gas burner as defined in claim 8 further including a base member for a barbecue grill with said burner element and tubular members housed therein and said gas supply means includes gas regulating means operatively positioned in a housing outside said base member.

18. The dual adjustable gas burner assembly as defined in claim 8 further including a base member for a barbecue grill with two of said burner elements housed therein as well as two of said first, second and third tubular members and said gas supply means includes gas regulatory means operatively positioned in a housing outside said base member for each said burner element.

19. A dual adjustable gas intake tube assembly for a gas burner element comprising:
- a first tubular member defining at least one lateral aperture;
- an air regulator member slidably received by said tubular member at one end thereof to controllably cover said lateral aperture;
- an opening defined by said tubular member at one end for receiving a gas supply means;
- a second tubular member in telescoping relationship with said first tubular member at the other end;
- a third tubular member in telescoping relationship with said second tubular member at an end opposite said first tubular member;
- means operatively associated with said third tubular member at an end opposite said second tubular member for connection with a gas burner element; and
- adjustable securing means operatively associated with said second and third tubular members to adjustably secure said respective tubular members in a fixed position.

* * * * *

UNITED STATES PATENT AND TRADEMARK OFFICE
CERTIFICATE OF CORRECTION

PATENT NO. : 4,478,205
DATED : October 23, 1984
INVENTOR(S) : Koziol

It is certified that error appears in the above—identified patent and that said Letters Patent is hereby corrected as shown below:

Column 1, line 49, "provede" should read --provide--

Column 4, line 28, "cross" should read --chrome--

Column 4, line 55, "⇄o" " should read --"o"--

Column 4, line 66, "Aslo" should read --Also--

Column 5, line 64, After "intake" insert --tube--

Column 7, line 14, After "burner" insert --assembly--

Signed and Sealed this

Eighteenth Day of June 1985

[SEAL]

Attest:

DONALD J. QUIGG

Attesting Officer     Acting Commissioner of Patents and Trademarks